US012780000B2

(12) United States Patent
Couperthwaite et al.

(10) Patent No.: US 12,780,000 B2
(45) Date of Patent: Nov. 3, 2026

(54) CAMERA MONITOR SYSTEM FOR ARTICULATED TRAILER USING IMAGE STITCHING

(71) Applicant: Stoneridge, Inc., Novi, MI (US)

(72) Inventors: John Couperthwaite, Ypsilanti, MI (US); Vamsi Konka, Novi, MI (US); Catalin Marius Gafencu, Novi, MI (US)

(73) Assignee: STONERIDGE, INC., Novi, MI (US)

(*) Notice: Subject to any disclaimer, the term of this patent is extended or adjusted under 35 U.S.C. 154(b) by 0 days.

(21) Appl. No.: 18/797,792

(22) Filed: Aug. 8, 2024

(65) Prior Publication Data

US 2025/0058633 A1 Feb. 20, 2025

Related U.S. Application Data

(60) Provisional application No. 63/519,300, filed on Aug. 14, 2023.

(51) Int. Cl.

| | |
|---|---|
| ***B60K 35/81*** | (2024.01) |
| ***B60R 1/22*** | (2022.01) |
| ***G06T 3/4038*** | (2024.01) |

(52) U.S. Cl.

CPC ................ *B60K 35/81* (2024.01); *B60R 1/22* (2022.01); *G06T 3/4038* (2013.01); *B60K 2360/186* (2024.01); *B60K 2360/21* (2024.01)

(58) Field of Classification Search

CPC .............. B60K 35/81; B60K 2360/186; B60K 2360/21; B60R 1/22; B60R 2300/802; B60R 1/28; B60R 1/26; B60R 2300/105; B60R 2300/303; G06T 3/4038;

(Continued)

(56) References Cited

U.S. PATENT DOCUMENTS

| | | | | |
|---|---|---|---|---|
| 6,690,413 | B1 * | 2/2004 | Moore | B60R 1/28 348/E7.086 |
| 6,933,837 | B2 | 8/2005 | Gunderson et al. | |
| 10,259,390 | B2 | 4/2019 | Zhang et al. | |

(Continued)

FOREIGN PATENT DOCUMENTS

| | | |
|---|---|---|
| CN | 105539286 A | 5/2016 |
| CN | 106536281 A | 3/2017 |

(Continued)

OTHER PUBLICATIONS

International Search Report and Written Opinion for International Application No. PCT/US2024/041435 mailed Nov. 8, 2024.

(Continued)

*Primary Examiner* — Farzana Hossain

(74) *Attorney, Agent, or Firm* — Carlson, Gaskey & Olds, P.C.

(57) ABSTRACT

A method of displaying a trailer of a vehicle includes capturing a tractor image and trailer image respectively from a tractor camera and a trailer camera, identifying a triggering event that relates to a loss of a view of at least a portion of trailer in the tractor image, stitching the tractor and trailer images together, and displaying the trailer image using the stitched tractor and trailer images in response to the triggering event to maintain the view of the at least the portion of the trailer.

15 Claims, 8 Drawing Sheets

(58) Field of Classification Search
CPC ........ B62D 13/06; B62D 15/027; H04N 7/18; H04N 7/181; H04N 23/698
See application file for complete search history.

(56) References Cited

U.S. PATENT DOCUMENTS

| | | | | |
|---|---|---|---|---|
| 10,518,702 | B2 | 12/2019 | Al Rasheed et al. | |
| 10,549,694 | B2 | 2/2020 | Murad et al. | |
| 11,034,305 | B2 | 6/2021 | Yoshida | |
| 11,383,646 | B2 | 7/2022 | Lang et al. | |
| 11,752,943 | B1 * | 9/2023 | Ma | G06T 3/20 348/148 |
| 2015/0286878 | A1 | 10/2015 | Molin et al. | |
| 2017/0124881 | A1 | 5/2017 | Whitehead | |
| 2017/0341583 | A1 | 11/2017 | Zhang et al. | |
| 2021/0053490 | A1 | 2/2021 | Smits | |
| 2021/0094473 | A1 * | 4/2021 | Gali | B60R 1/26 |
| 2021/0178971 | A1 | 6/2021 | Lu et al. | |
| 2021/0206329 | A1 | 7/2021 | Hamlin et al. | |
| 2023/0061195 | A1 * | 3/2023 | Quinton | G06F 16/50 |
| 2024/0064274 | A1 * | 2/2024 | Blank | B60R 1/25 |
| 2024/0430574 | A1 * | 12/2024 | Burns | H04N 23/90 |
| 2025/0153641 | A1 * | 5/2025 | Fu | B60R 1/25 |
| 2025/0218030 | A1 * | 7/2025 | Wei | G06T 7/13 |

FOREIGN PATENT DOCUMENTS

| | | | |
|---|---|---|---|
| CN | 112373391 | A | 2/2021 |
| CN | 114449214 | A | 5/2022 |
| DE | 102010032411 | A1 | 2/2012 |
| EP | 2893527 | B1 | 8/2017 |
| JP | 2016040140 | A | 3/2016 |
| JP | 2022500304 | A | 1/2022 |
| WO | 2023121911 | A1 | 6/2023 |

OTHER PUBLICATIONS

International Preliminary Report on Patentability for International Application No. PCT/US2024/041435 mailed Jul. 25, 2025.
Chinese Office Action for Chinese Patent Application No. 202480052802.9 mailed May 16, 2026.
Japanese Office Action for Japanese Application No. 2026-508683 mailed Jun. 30, 2026.

* cited by examiner

CAMERA MONITOR SYSTEM FOR ARTICULATED TRAILER USING IMAGE STITCHING

CROSS-REFERENCE TO RELATED APPLICATION

This application claims priority to Untied States Provisional Application No. 63/519,300 filed Aug. 14, 2023.

TECHNICAL FIELD

This disclosure relates to a camera monitor system (CMS) for use in a commercial truck or similar vehicle, and, in particular, to a CMS that maintains a view of a trailer pulled by a tractor during various maneuvers.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the CMS covers a larger field of view than a conventional mirror, or include views that are not fully obtainable via a conventional mirror.

In a typical CMS, there is a camera arm arranged on each of the left- and right-hand sides of the vehicle to provide Class II and Class IV views or similar views. A display is provided on the A-pillar on both driver and passenger sides to display the field of view for the camera arm on that side, simulating a conventional mirror.

The trailer articulates relative to the tractor during a vehicle turning maneuver. It has become common in passenger vehicles to provide a surround view or a bird's eye view about the perimeter of the vehicle. This industry feature has extended to passenger vehicles and light duty trucks that tow a trailer, for example by using a camera at the center-rear of the trailer. The captured images from multiple cameras (including the trailer-mounted rear-facing camera) about the perimeter of the vehicle are stitched together to create a relatively seamless, single view. However, such surround views make the trailer essentially invisible so that the end of the trailer cannot clearly be seen relative to any nearby objects.

It is particularly desirable to maintain a view of the end of the trailer during these turning maneuvers in commercial trucking applications. To this end, the displayed view in the vehicle can be "panned" or shifted as the vehicle turns. This feature can be accomplished by a variety of techniques. However, panning has its limitations at greater trailer articulation angles as the view of trailer end or other trailer features eventually will be lost by the tractor-mounted cameras.

SUMMARY

In one exemplary embodiment, a method of displaying a trailer of a vehicle includes capturing a tractor image and trailer image respectively from a tractor camera and a trailer camera, identifying a triggering event that relates to a loss of a view of at least a portion of trailer in the tractor image, stitching the tractor and trailer images together, and displaying the trailer image using the stitched tractor and trailer images in response to the triggering event to maintain the view of the at least the portion of the trailer.

In a further embodiment of any of the above, the stitching step is performed prior to the identifying step.

In a further embodiment of any of the above, the stitching step is performed concurrently with the identifying step.

In a further embodiment of any of the above, the tractor and trailer cameras are provided from one side of the vehicle, and another tractor camera and another trailer camera is provided on another side of the vehicle, and includes the steps of capturing, stitching, identifying and displaying using other tractor and trailer images respectively from the other tractor and trailer cameras.

In a further embodiment of any of the above, the trailer camera is mounted on the trailer and the trailer image includes a trailer side view.

In a further embodiment of any of the above, the trailer side view includes an end of the trailer.

In a further embodiment of any of the above, the trailer side view includes wheels of the trailer.

In a further embodiment of any of the above, the triggering event includes a trailer angle above a predetermined threshold.

In a further embodiment of any of the above, the predetermined threshold is at least 45°.

In a further embodiment of any of the above, the triggering event includes identifying a loss of a view of a trailer in tractor image.

In a further embodiment of any of the above, the loss of view includes a loss of a view of an end of the trailer.

In a further embodiment of any of the above, a loss of view includes a loss of a view of wheels of the trailer.

In a further embodiment of any of the above, the triggering event corresponds to actuation of a switch by a vehicle operator.

In a further embodiment of any of the above, the displaying steps includes changing from a different displayed view on a display within the vehicle. The displaying step is performed on the display.

In a further embodiment of any of the above, the displaying steps includes expanding upon a previously displayed view on a display within the vehicle. The displaying step is performed on the display.

In a further embodiment of any of the above, the method includes the step of switching from the stitched tractor and trailer images to displaying the trailer image in response to another triggering event.

In another exemplary embodiment, a method of displaying a trailer of a vehicle includes capturing a tractor image and trailer image respectively from a tractor camera and a trailer camera, displaying the tractor image, identifying a triggering event relating to a loss of a view of at least a portion of trailer in the tractor image, switching from the tractor image to display the trailer image in response to the triggering event to maintain the view of the at least the portion of the trailer.

In another exemplary embodiment, a camera monitor system (CMS) includes multiple cameras that include first and second cameras respectively configured to mounted to a tractor and a trailer, the first and second cameras are configured to provide first and second fields of view, at least one display that is configured to respectively depict at least portions of the first and second fields of view, an input that is configured to provide a triggering event, and a controller that is in communication with the multiple cameras, the at least one display and the input, the controller includes an image processor that is configured to provide a stitched view of at least portions of the first and second fields of view together in response to the triggering event, the at least one display is configured to depict the stitched view.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
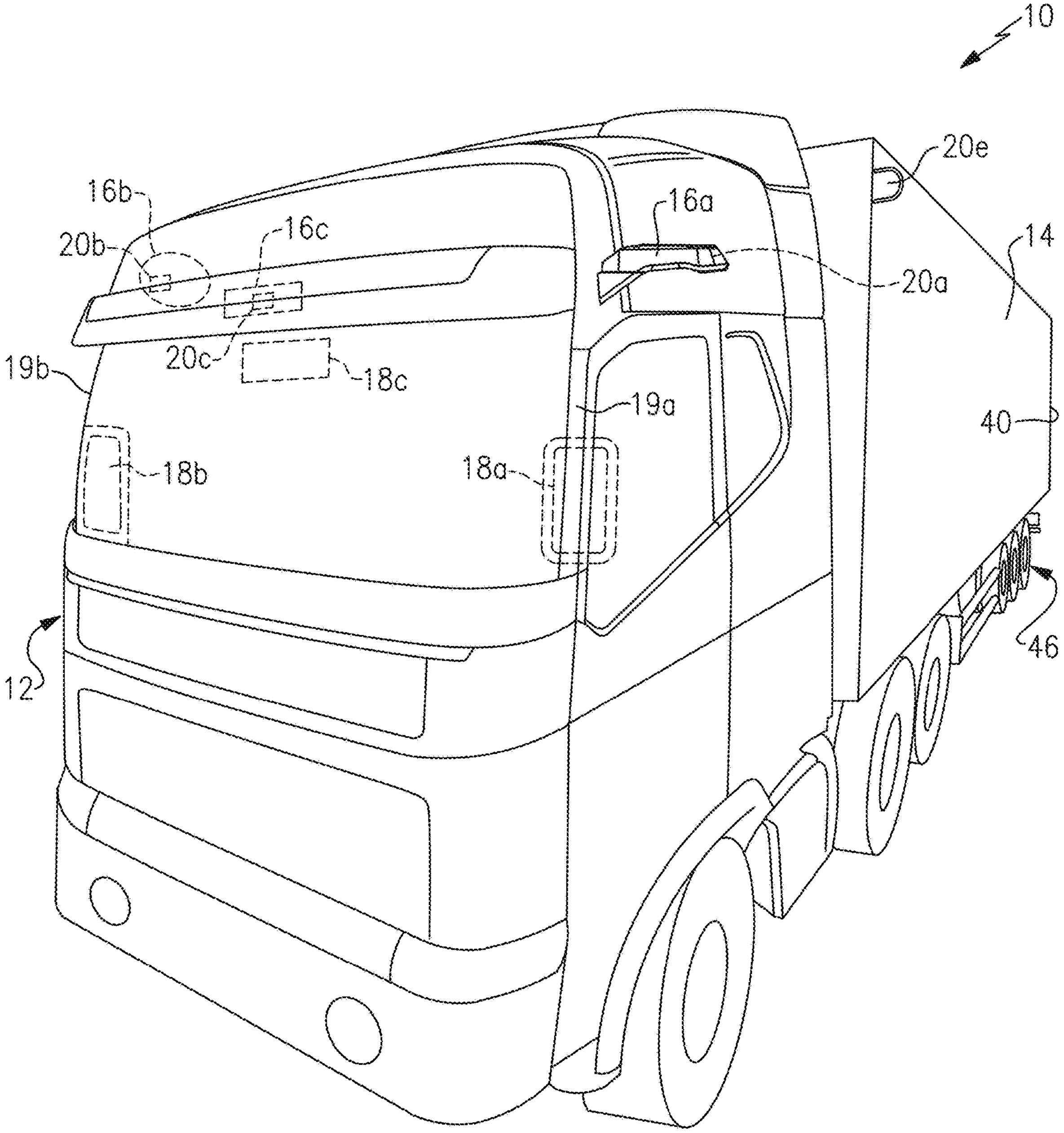
FIG. 1A is a schematic front view of a commercial truck with a camera monitor system (CMS) used to provide at least Class II and Class IV views.
Figure 1B:
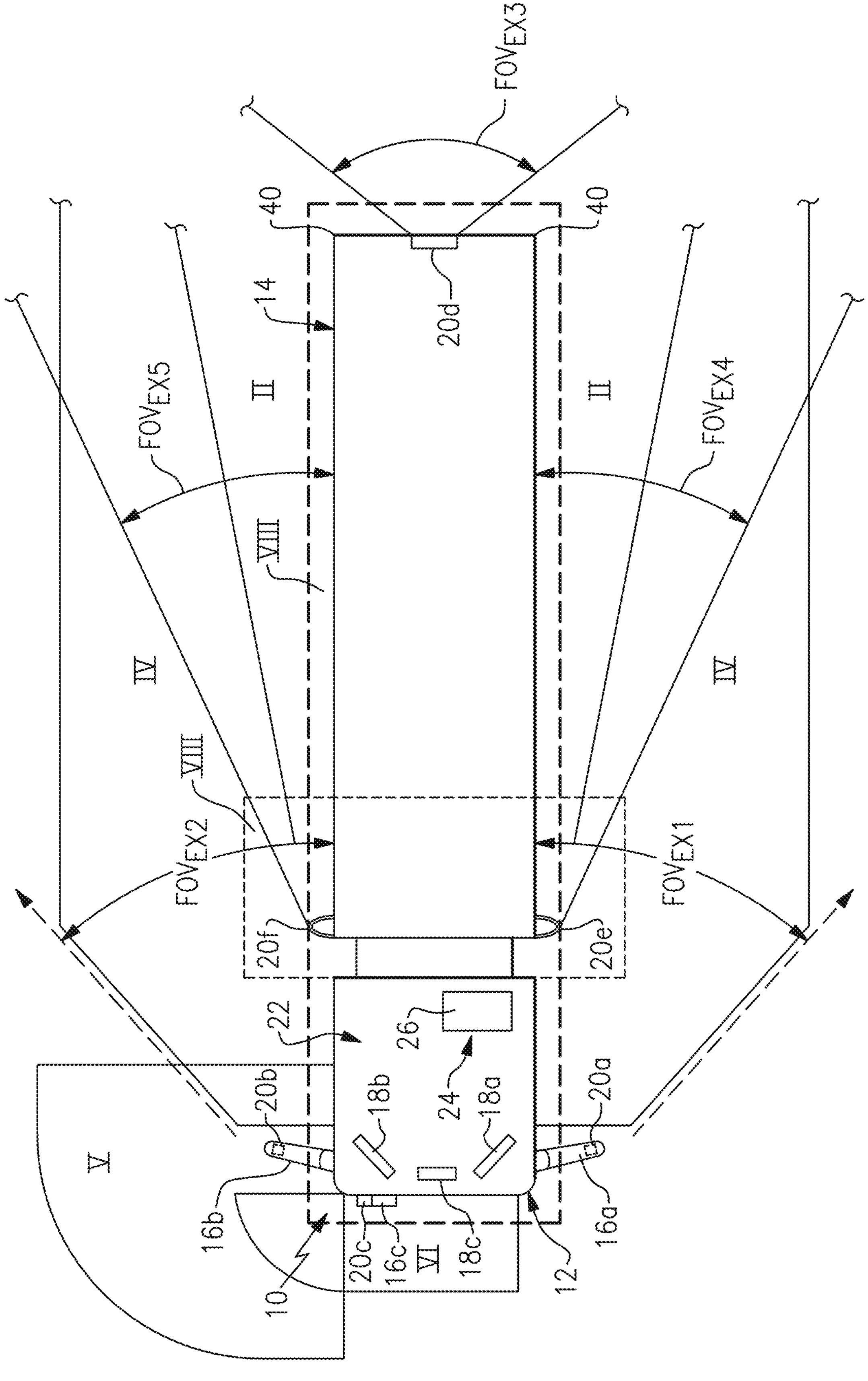
FIG. 1B is a schematic top view of a commercial truck with a camera mirror system illustrating Class II, Class IV, Class V, Class VI and Class VIII views.

A schematic view of a commercial vehicle 10 is illustrated in FIGS. 1A and 1B. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2A) that has driver and passenger side camera arms 16*a*, 16*b* mounted to the outside of the vehicle cab 12. If desired, the camera arms 16*a*, 16*b* may include conventional mirrors integrated with them as well, although the CMS 15 can be used in some examples to entirely replace mirrors. In additional examples, each side can include multiple camera arms, each arm housing one or more cameras and/or mirrors.

Each of the camera arms 16*a*, 16*b* includes a base that is secured to, for example, the cab 12. A pivoting arm is supported by the base and may articulate relative thereto, if such a feature is desired. At least one rearward facing camera 20*a*, 20*b* is arranged respectively within camera arms 16*a*, 16*b*. Each arm 16*a*, 16*b* may also provide a housing that encloses electronics, e.g., a controller 28 (FIG. 2), that are configured to provide various features of the CMS 15.

The exterior cameras 20*a*, 20*b* respectively provide an exterior field of view $FOV_{EX1}$, $FOV_{EX2}$ that each include at least one of the Class II and Class IV views (FIG. 1B), which are legal prescribed views in the commercial trucking industry. The Class II view on a given side of the vehicle 10 is a subset of the class IV view of the same side of the vehicle 10. Multiple cameras also may be used in each camera arm 16*a*, 16*b* to provide these views, if desired. Class II and Class IV views are defined in European R46 legislation, for example, and the United States and other countries have similar driver visibility requirements for commercial trucks. Any reference to a "Class" view is not intended to be limiting, but is intended as exemplary for the type of view provided to a display by a particular camera.

First and second video displays 18*a*, 18*b* are arranged on each of the driver and passenger sides within the vehicle cab 12 on or near the A-pillars 19*a*, 19*b* (generally, A-pillar 19), for example, to display Class II and Class IV views on its respective side of the vehicle 10, which provide rear facing side views along the vehicle 10 that are captured by the exterior cameras 20*a*, 20*b*.

If video of Class V and/or Class VI views are also desired, a camera housing 16*c* and camera 20*c* may be arranged at or near the front of the vehicle 10 to provide those views (FIG. 1B). A third display 18*c* arranged within the cab 12 near the top center of the windshield can be used to display the Class V and Class VI views, which are toward the front of the vehicle 10, to the driver. The displays 18*a*, 18*b*, 18*c* (generally, display 18) face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings (e.g., cameras 20*d*, 20*e* and/or 20*f*) can be disposed at the sides and rear of the vehicle 10 to provide fields of view (e.g., $FOV_{EX3}$, $FOV_{EX4}$ and/or $FOV_{EX5}$) including some or all of the Class VIII zones of the vehicle 10. In such examples, the third display 18*c* can include one or more frames displaying the Class VIII views. Alternatively, additional displays can be added near the first, second and third displays 18*a*, 18*b*, 18*c* to provide a display dedicated to providing a Class VIII view (e.g., as shown in FIGS. 3A-3D).

If desired, a rear-facing center-mounted camera 20*d* may be provided at the rear of the trailer 14 for providing a field of view $FOV_{EX3}$ to the driver during reverse driving maneuvers such as docking. With the disclosed example vehicle, left- and right-side rear-facing trailer cameras 20*e*, 20*f* may be mounted at or near the front of the trailer 14 for providing additional fields of view $FOV_{EX4}$, $FOV_{EX5}$ alongside the trailer 14 in at least the disclosed conditions. One example trailer camera 20*e*, 20*f* mounting arrangement is disclosed in U.S. provisional patent application No. 63/354,925, entitled "MODULAR SEMI-TRAILER SENSOR SUITE," filed on Jun. 23, 2022, and which is incorporated herein by reference in its entirety. Rather that removably mounting the trailer cameras 20*e*, 20*f*, these cameras may be more permanently affixed to the trailer 14, if desired. In this disclosure, the cameras 20*e*, 20*f* are mounted and oriented such that the camera's field of view includes a view of at least a portion of the trailer 14, such as an end 40 of the trailer 14 and/or the trailer wheels 46.

The cameras 20*d*, 20*e*, 20*f* are in communication with the CMS 15 using a trailer connectivity architecture such as the configuration disclosed in, for example, PCT application no. PCT/US22/34710 entitled, "TRAILER CAMERA COMMUNICATIONS SYSTEM," filed on Jun. 23, 2022 and which is incorporated herein by reference in its entirety. Of course, other suitable trailer communications architectures may be used to communicate the captured image data to the tractor 12, where the CMS controller 28 typically is located.

In terms of hardware architecture of the controller 28, such a computing device can include a processor, memory, and one or more input and/or output (1/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 30 (FIG. 2) may be a hardware device for executing software, particularly software stored in memory. The controller 30 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 30 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The controller 30 includes an image processor for processing images provided by the cameras 20.

Figure 2:
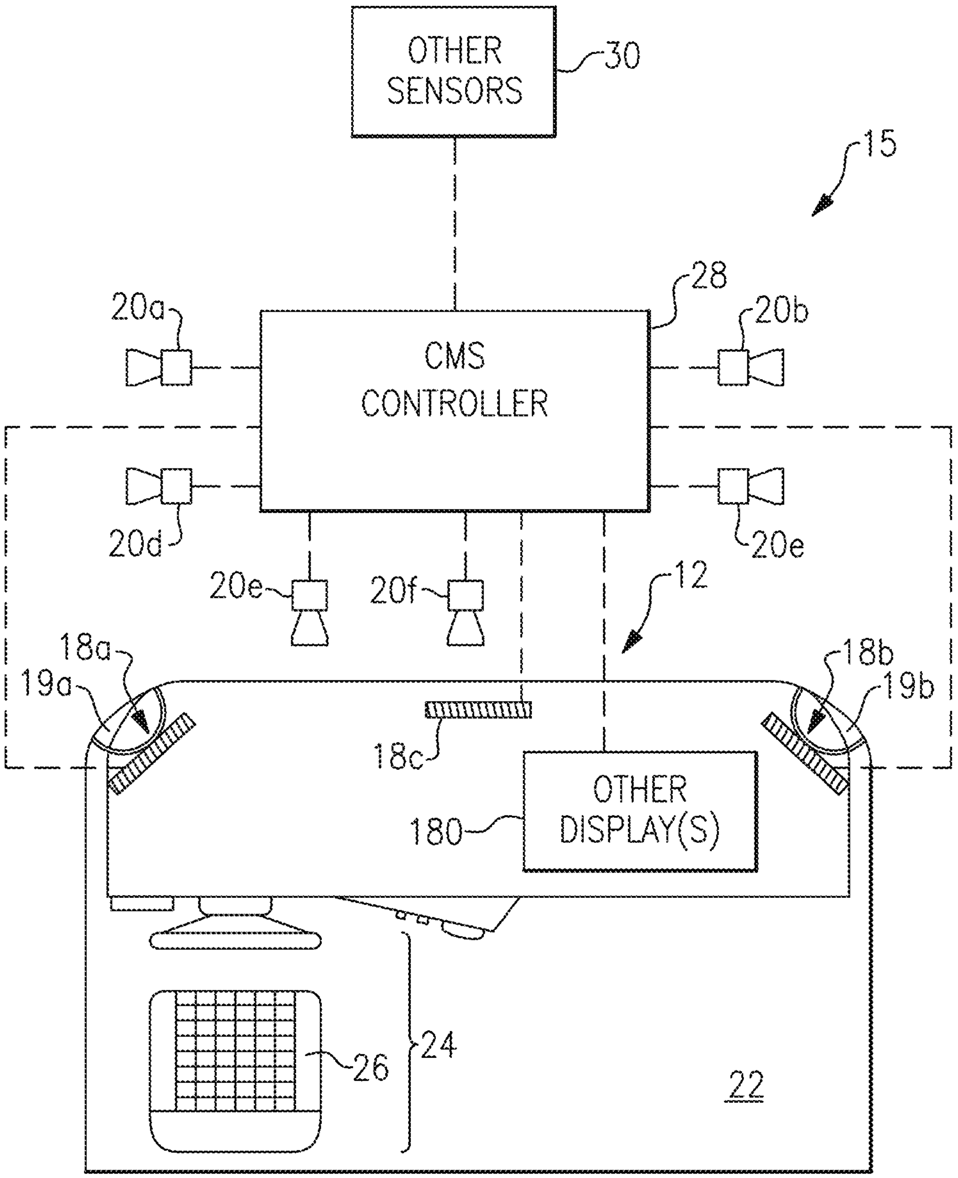
FIG. 2 is a schematic top view of a vehicle cabin incorporating a CMS and including displays.

Referring to FIG. 2, numerous displays are positioned within the cab 22 to provide visibility to the driver of the vehicle exterior. As previously described, the displays 18*a*, 18*b* respectively provide left- and right-side views (e.g., Class II/IV) of the vehicle, and the display 18*c* may additionally provide front/corner views (e.g., Class V/VI) of the tractor 12, if desired. Other displays 180 may also be used to provide additional (e.g., Class VIII) or enhanced views not typically provided by the displays 18*a*, 18*b*, and/or 18*c*. Sensors 30, such as ultrasonic, LiDAR, radar, may be used at various locations on the vehicle 10 (e.g., co-located with cameras 20) for providing displayed graphical overlays and/or alerts to the driver to further enhance driver awareness.

Example vehicle cab display configurations are illustrated in FIGS. 3A-3D and which are not intended to be limiting. In the examples illustrated in FIGS. 3A-3C, driver information displays 180*a*, 180*b* are part of a driver information system (DIS) provided on the instrument panel, respectively, behind and/or above the steering wheel and near the center of the vehicle. The display 180*a* typically provides vehicle information, such as speed, engine RPM, temperature and other vehicle operating parameters. The display 180*b* is typically used for entertainment (e.g., radio) and/or control of vehicle systems such as HVAC. Of course, the displays 180*a*, 180*b* may have other uses or be arranged at other locations.

In one example, the displays 18*a*, 18*b* arranged in a portrait configuration in which the aspect ratio is larger in the height direction than the width direction. The Class II view may be depicted at the top and the Class IV view may be depicted at the bottom on their respective display 18*a*, 18*b*. The Class II and Class IV may be separated by a bar that is depicted on the screen. It should be understood that these views may be illustrated differently than described, if desired. The display 18*c*, if used, is arranged at or near the center of the windshield, although it may be located elsewhere, for example, on the A-pillar opposite the driver.

An external mirror 36 may be mounted on the outside of the tractor 12, if desired by the customer or operator, although the disclosed CMS 15 does not require a mirror.

It is common to pan the Class II view as the trailer 14 articulates relative to the tractor 12 so as to keep the trailer end or other portion of the trailer in the displayed view. As the trailer angle increases (e.g., above 45°), the cameras 20*a*, 20*b* no longer have a wide enough field of view to maintain this desired view. The disclosed CMS 15 incorporates additional cameras 20*d*, 20*e* mounted to the trailer 14 to maintain the desired view by stitching multiple camera views to one another.

Figure 3A:
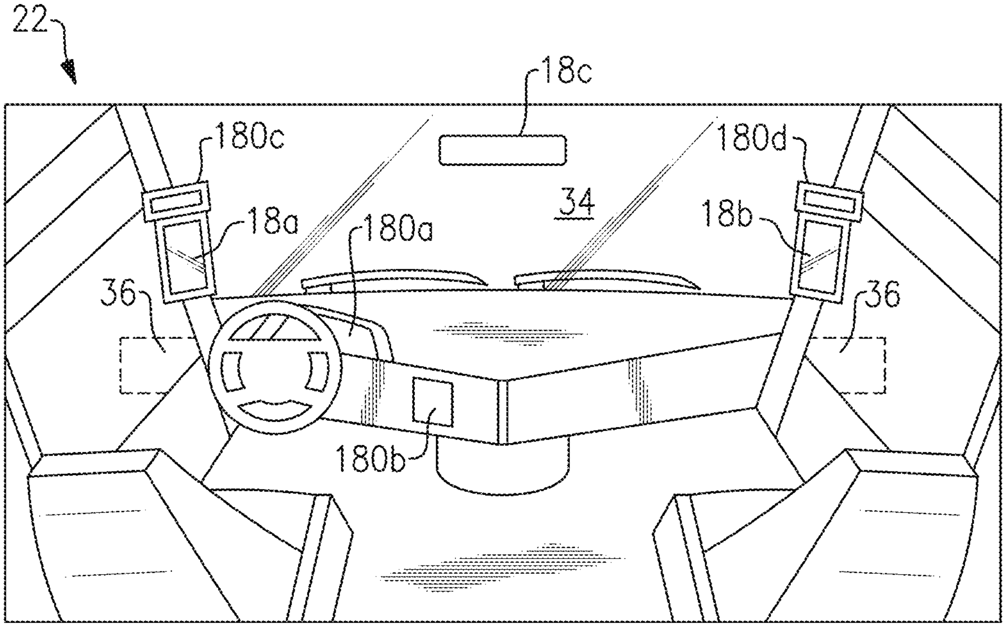
FIG. 3A is a perspective view of the vehicle cabin with one example display configuration.
Figure 3B:
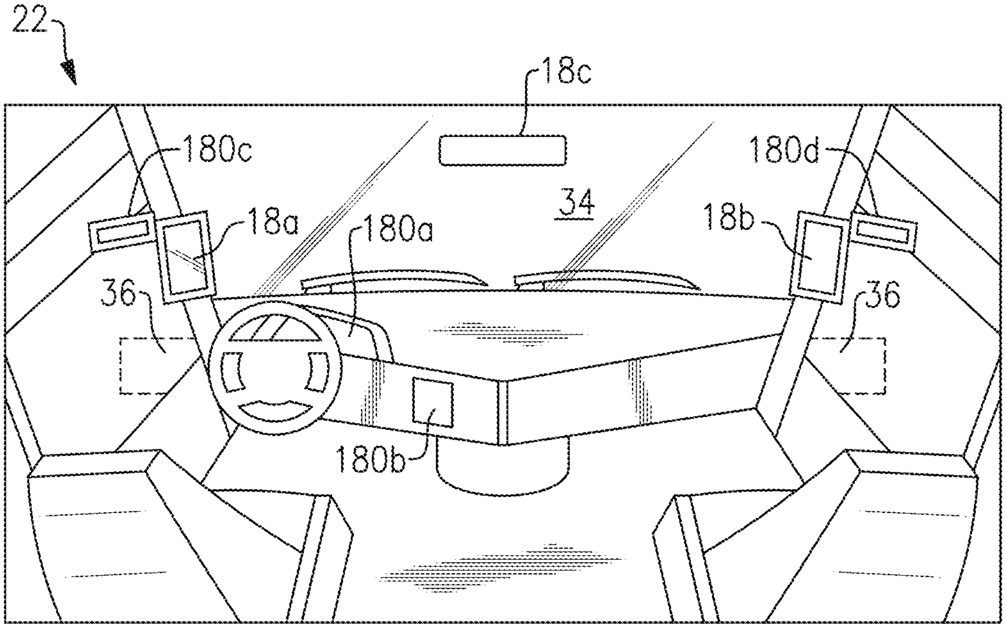
FIG. 3B is a perspective view of the vehicle cabin with another example display configuration.
Figure 3C:
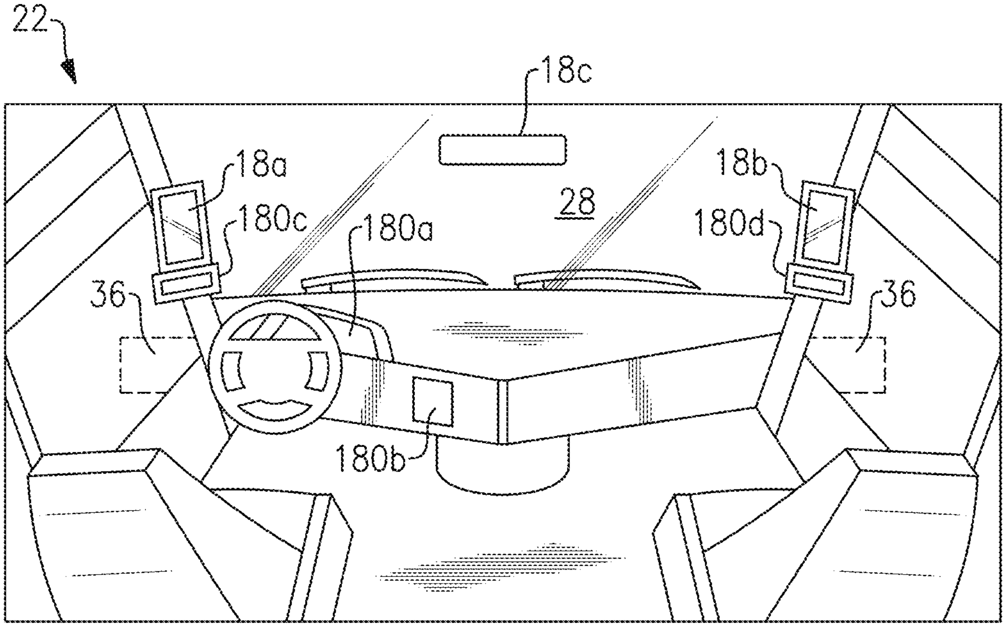
FIG. 3C is a perspective view of the vehicle cabin with yet another example display configuration.
Figure 3D:
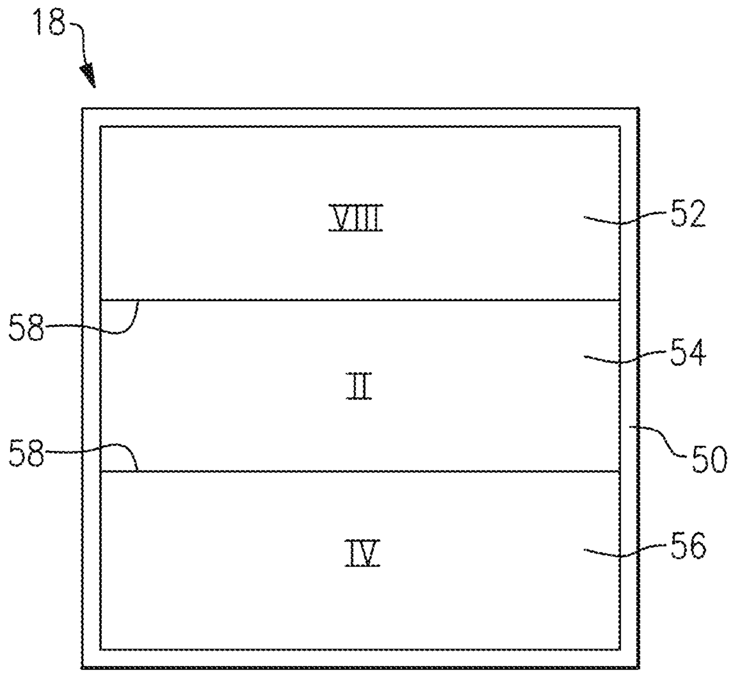
FIG. 3D depicts an example display with various views provided by the CMS.

The disclosed stitched views may be displayed on any one of the disclosed displays, or on another display, if desired. In FIGS. 3A-3C, an additional display 180*c*, 180*d* is provided at or near the A-pillars in proximity to the displays 18*a*, 18*b* (FIG. 3A: above; FIG. 3B: alongside; FIG. 3C: below). In another example, the disclosed stitched views may be displayed on the displays 18*a*, 18*b* along with the Class II and Class IV views, e.g., above the Class II view as shown in FIG. 3D. The displayed Class VIII (including the stitched view) 42, displayed Class II view 54 and displayed Class IV view 56 are illustrated on a common screen 50 are separated by displayed separating bars 58, for example. In such an example, a relatively large screen may be used to display the images sufficiently large for the driver.

Figure 4:
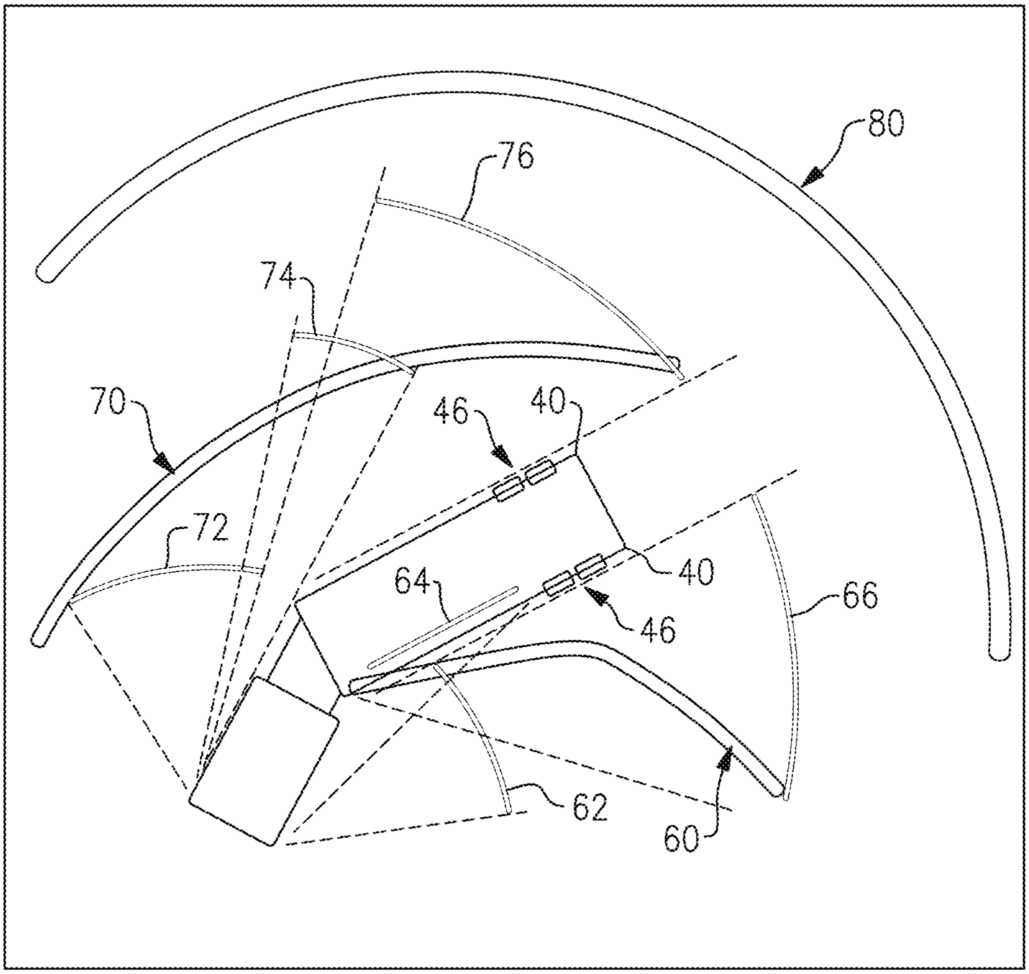
FIG. 4 is a schematic illustrating the views provided by various cameras of the CMS for an example vehicle orientation.

Referring to FIG. 4, in a CMS 15 using one camera per side to provide the Class II and Class IV views, $FOV_{EX1}$ provides viewing regions 62, 64 that respectively correspond to the Class II and Class IV on the left side of the vehicle 10. Similarly, $FOV_{EX2}$ provides viewing regions 72, 74 that respectively correspond to the Class II and Class IV on the right side of the vehicle 10. For the trailer angle shown in FIG. 4, the Class II views are incapable of capturing the trailer end 40 or wheels 46. However, $FOV_{EX4}$ and $FOV_{EX5}$ respectively provided by trailer cameras 20*e*, 20*f* capturing viewing regions 66, 76 are able to maintain a view of these features.

While the CMS 15 may be operated to illustrate the regions 66, 76 on one or more displays, this video information may not be easily or quickly assimilated by the driver. To this end, it may be desirable to stitch the viewing regions 66, 76 with other regions to provide continuity with other captured views, giving better context to the driver while providing a more natural, easy to understand view.

Figure 5:
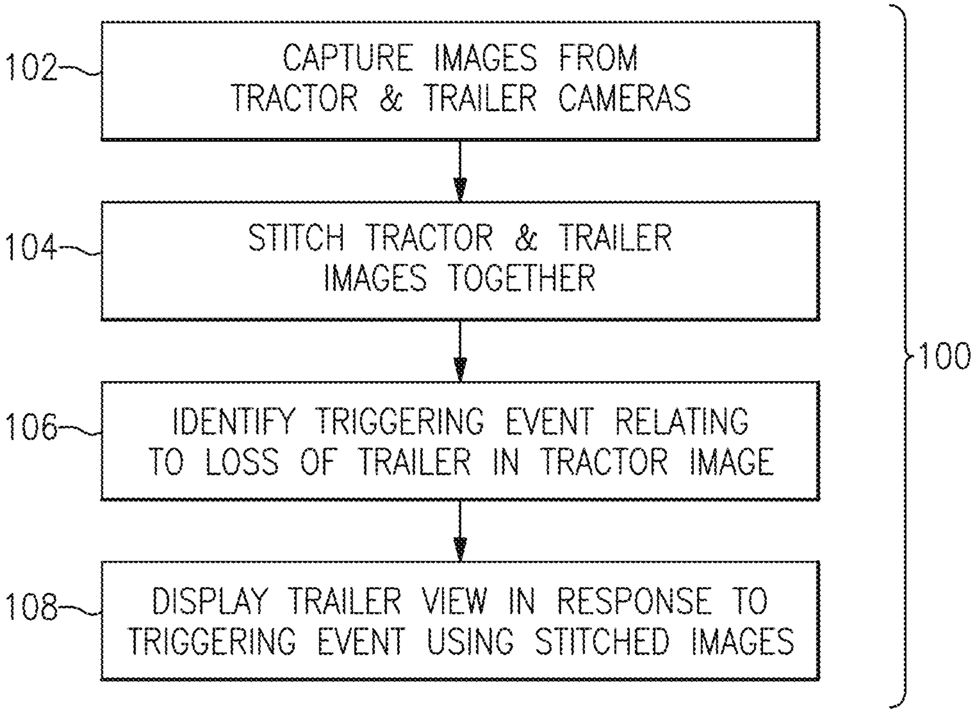
FIG. 5 is a flowchart depicting a method of displaying a trailer of a vehicle according to the disclosure.

The CMS 15 employs a method 100 of displaying a trailer 14 of a vehicle 10, as shown in FIG. 5. The method 100 includes capturing a tractor image (e.g., regions 62, 64, 72, 72) and trailer image (e.g., 66, 76) respectively from a tractor camera (20*a* and/or 20*b*) and a trailer camera (20*e* and/or 20*f*) (block 102).

Images of different regions of the tractor 12 and trailer 14 are stitched together to provide a seemingly single displayed view (block 104). This stitching step may be performed continuously by the CMS, on response to or in anticipation of a triggering event. The triggering event, which may occur concurrently to the stitching step, is identified. The triggering event relates to an actual or anticipated loss of a view of at least a portion of trailer (e.g., trailer end 40 and/or wheels 46) in the tractor image (e.g., regions 62, 64, 72, 72) (block 106).

In one example, the triggering event corresponds to the trailer angle exceeding a predetermined threshold, for example, 45°. However, it should be understood that other trailer angles may be used, since, for example, the portion of the trailer desired for continuous viewing may not be visible at other trailer angles, particularly for different trailer lengths or configurations. In another example, the trigger event may be provided by image processing, such as identifying an imminent or actual loss of view of the trailer end 40 and/or wheels 46 by one or more of the tractor cameras 20*a*, 20*b*. Alternatively or additionally, the driver may provide the triggering event by manually activating a switch.

Figure 6A:
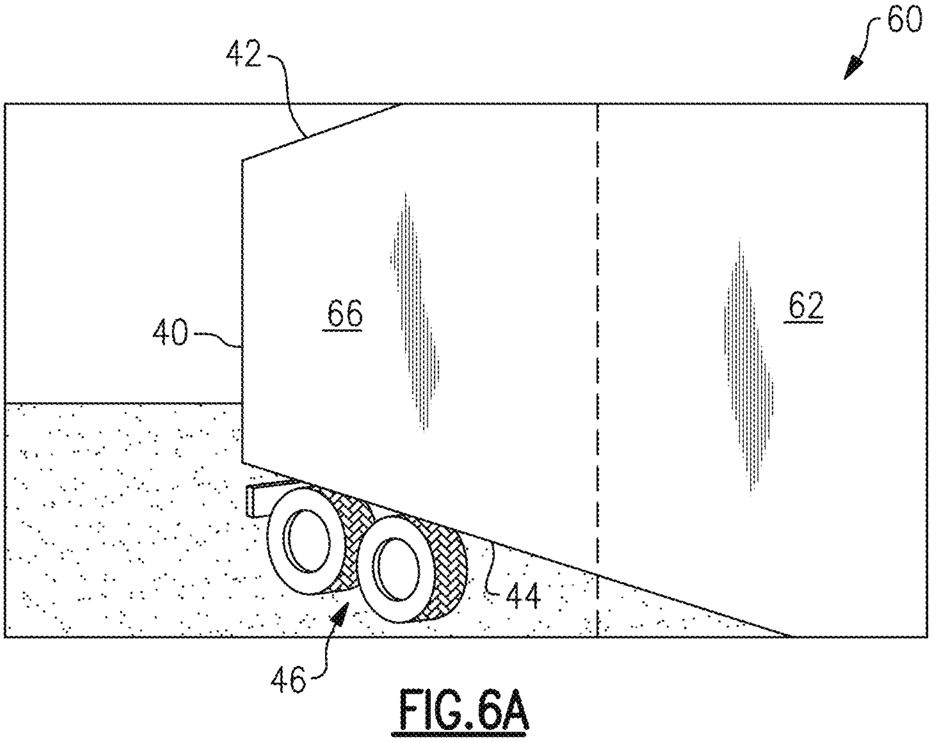
FIGS. 6A and 6B respectively illustrate displayed views according to the disclosed method on left and right sides of the vehicle for the vehicle orientation shown in FIG. 4.
Figure 6B:
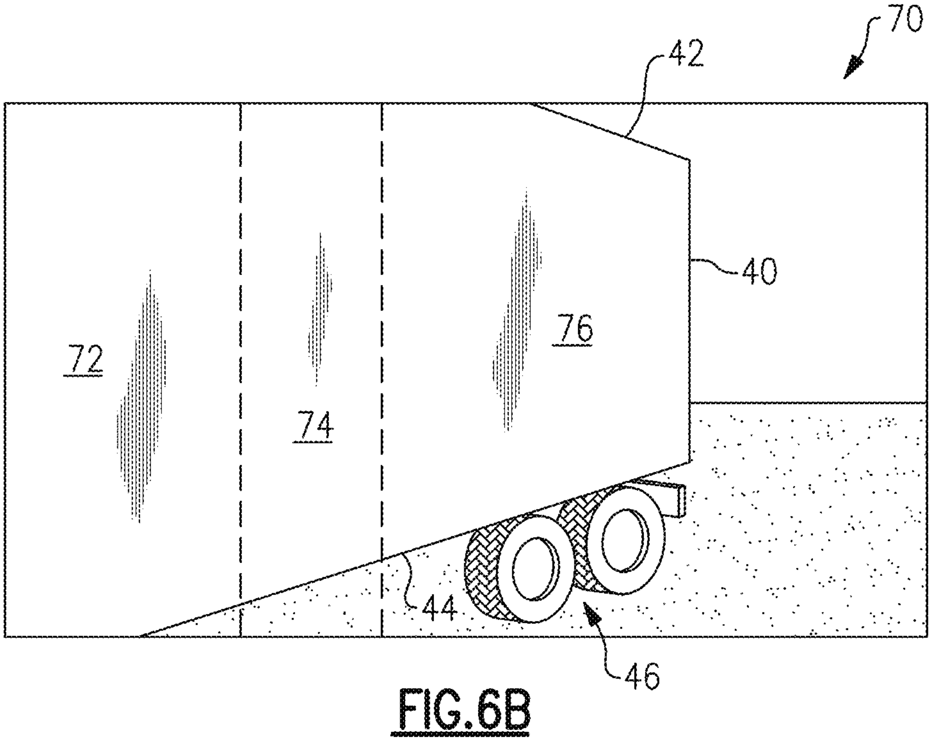

The stitched tractor and trailer images are displayed to provide the trailer view in response to the triggering event to maintain the view of the at least the portion (e.g., trailer end 40 and/or wheels 46) of the trailer 14 (block 108). For the example shown in FIG. 4, the viewing regions 62 and 66 are stitched together to provide a stitched tractor and trailer image 60, which may be displayed as shown in FIG. 6A. The viewing regions 72, 74 and 76 are stitched together to provide a stitched tractor and trailer image 70, which may be displayed as shown in FIG. 6B. In the examples shown, upper and lower trailer edges 42, 44 remain in view to provide a displayed view similar to that of a Class II view. In any event, a surround view 80 (FIG. 4) is not provided (e.g., the image from the rear trailer camera 20*d* is not stitched), as that would make the trailer end 40 invisible to the driver. Known stitching techniques may be used, such as those disclosed in International Application No. PCT/EP2020/054406, entitled "MIRROR REPLACEMENT SYSTEM WITH DYNAMIC STITCHING," filed on Feb. 19, 2020 and incorporated herein by reference in its entirety.

The stitched tractor and trailer images may be provided on one or more of the displays 18, 180. In one example, the stitched tractor and trailer images may be swapped in for a previously displayed, different view, for example, replacing a view on one of the displays 18*c*, 180*a* and/or 180*b*. In another example, the stitched tractor and trailer images may expand upon a previously displayed view, for example, expanding upon a Class IV view.

As the trailer angle increases, the view provided by the tractor camera is of diminishing value. For example, as the trailer angle nears 90° the Class II view provided by the tractor camera may only show the side of the trailer. Accordingly, CMS 15 may switch from a the tractor image and/or the stitched view to provided a view from only the trailer view from the trailer camera. There may be other cases where only showing the trailer camera view could be beneficial as compared to the stitched view. In this case, the CMS 15 reverts to displaying an unstitched view of (or at least the trailer camera portion of the unstitched view) provided by the tractor camera. Alternatively, the operator may manually toggle between stitched and unstitched (either only tractor camera or only trailer camera) views.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of displaying a trailer of a vehicle, comprising:

- capturing a rear-facing tractor image from a rear-facing tractor camera;
- capturing a rear-facing trailer image from a rear-facing trailer camera;
- identifying a triggering event by image processing captured images from the rear-facing tractor camera, wherein the triggering event corresponds to an actual or anticipated loss of a view of at least a portion of the trailer in the rear-facing tractor image based upon the image-processed captured images, wherein the loss of view of at least a portion of the trailer includes at least one of a loss of a view of an end of the trailer and a loss of a view of wheels of the trailer;
- stitching the rear-facing tractor and trailer images together into a single stitched rear-facing seamless image; and
- displaying the stitched single rear-facing seamless image using the stitched rear-facing tractor and trailer images in response to the triggering event to maintain the view of the at least the portion of the trailer.

2. The method of claim 1, wherein the stitching step is performed prior to the identifying step.

3. The method of claim 1, wherein the stitching step is performed concurrently with the identifying step.

4. The method of claim 1, wherein the tractor and trailer cameras are provided from one side of the vehicle, and another tractor camera and another trailer camera is provided on another side of the vehicle, comprising the steps of capturing, stitching, identifying and displaying using another tractor image from the other tractor camera and another trailer image from the other trailer camera.

5. The method of claim 1, wherein the trailer camera is mounted on the trailer and the trailer image includes a trailer side view.

6. The method of claim 5, wherein the trailer side view includes an end of the trailer.

7. The method of claim 5, wherein the trailer side view includes wheels of the trailer.

8. The method of claim 1, wherein the triggering event includes a trailer angle above a predetermined threshold.

9. The method of claim 8, wherein the predetermined threshold is at least 45°.

10. The method of claim 1, wherein the stitched single rear-facing seamless image provides at least the portion of the trailer using both the rear-facing tractor image from the rear-facing tractor camera and the rear-facing trailer image from the rear-facing trailer camera.

11. The method of claim 1, wherein the triggering event corresponds to actuation of a switch by a vehicle operator.

12. The method of claim 1, wherein the displaying steps includes changing from a different displayed view on a display within the vehicle, the displaying step performed on the display.

13. The method of claim 12, wherein the displaying steps includes expanding upon a previously displayed view on a display within the vehicle, the displaying step performed on the display.

14. The method of claim 1, comprising the step of switching from the stitched tractor and trailer images to displaying the trailer image in response to another triggering event.

15. A camera monitor system (CMS) comprising:

multiple cameras including first and second cameras respectively configured to mounted to a tractor and a trailer, the first and second cameras configured to provide first and second rear-facing fields of view;

at least one display configured to respectively depict at least portions of the first and second rear-facing fields of view each of which includes a portion of the trailer;

an input configured to provide a triggering event by image processing captured images from the first camera, wherein the triggering event corresponds to an actual or anticipated loss of view of at least a portion of the trailer in the rear-facing tractor image based upon the image-processed rear-facing tractor image, wherein the loss of view of at least a portion of the trailer includes at least one of a loss of a view of an end of the trailer and a loss of a view of wheels of the trailer; and a controller in communication with the multiple cameras, the at least one display and the input, the controller including an image processor configured to provide a single stitched rear-facing seamless image of at least portions of the first and second fields of view together in response to the triggering event, the at least one display configured to depict the stitched single rear-facing seamless image including both portions of the trailer from the first and second rear-facing fields of view.

* * * * *